United States Patent
Dantu et al.

(10) Patent No.: US 6,532,088 B1
(45) Date of Patent: Mar. 11, 2003

(54) SYSTEM AND METHOD FOR PACKET LEVEL DISTRIBUTED ROUTING IN FIBER OPTIC RINGS

(75) Inventors: Ram Dantu, Richardson, TX (US); Pete O'Connell, Heath, TX (US)

(73) Assignee: Alcatel (FR)

( * ) Notice: Subject to any disclaimer, the term of this patent is extended or adjusted under 35 U.S.C. 154(b) by 0 days.

(21) Appl. No.: 09/393,747

(22) Filed: Sep. 10, 1999

(51) Int. Cl.[7] .................. H04B 10/20; H04J 14/00
(52) U.S. Cl. ............... 359/119; 359/123; 359/124; 359/161; 370/223
(58) Field of Search ................. 359/119, 123, 359/124, 161; 370/223

(56) References Cited

U.S. PATENT DOCUMENTS

| | | | | |
|---|---|---|---|---|
| 5,068,916 A | * | 11/1991 | Harrison et al. | 455/39 |
| 5,914,798 A | * | 6/1999 | Liu | 359/161 |
| 6,111,673 A | * | 8/2000 | Chang et al. | 359/123 |
| 6,160,651 A | * | 12/2000 | Chang et al. | 359/124 |
| 6,163,392 A | * | 12/2000 | Condict et al. | 359/124 |
| 6,271,946 B1 | * | 8/2001 | Chang et al. | 359/124 |
| 6,292,464 B1 | * | 9/2001 | Elahmadi et al. | 370/223 |
| 6,295,146 B1 | * | 9/2001 | Nathan et al. | 359/119 |

* cited by examiner

Primary Examiner—John A. Tweel
(74) Attorney, Agent, or Firm—James D. Harrison; V. Lawrence Sewell; Jessica W. Smith

(57) ABSTRACT

An apparatus and a method for transporting IP user traffic over a fiber optic ring network that includes a plurality of fiber optic ring network nodes. One ring is for conducting the user traffic on a working path and the other ring is for conducting the same user traffic on a protection path in the event of a failure in a communication link in the first ring on a protection path. A central node is coupled to a plurality of nodes to provide forwarding tables and updates to the nodes. As a result, IP traffic may be routed through the fiber optic ring network in a manner that provides fast switching from a working path to a protection path to minimize lost data packets whenever a communication link in the working path fails. Additionally, this capability is provided without requiring each node to have full IP routing capability. The forwarding tables for the protection and working paths provide for path routes and forwarding for the packets on a packet by packet basis. Accordingly, a ring may serve as both a working path and a protection path according to the origin and destination of the data packets traveling thereon. Additionally, the central node is adapted to generate multiple forwarding tables to accommodate packet by packet forwarding in a network created to support virtual private networks. The forwarding tables also are set up to support multicast transmissions of data packets.

8 Claims, 10 Drawing Sheets

SYSTEM AND METHOD FOR PACKET LEVEL DISTRIBUTED ROUTING IN FIBER OPTIC RINGS

CROSS REFERENCE TO RELATED APPLICATIONS

This application is related to and includes by reference the following application in its entirety, said application being concurrently filed herewith this application:

BACKGROUND

The present invention relates generally to data transmission in fiber optic ring networks, by way of example, the synchronous optical networks, (SONET networks) and Synchronous Digital Hierarchy networks (SDH networks) and more particularly, to the routing of IP data packets through the fiber optic ring networks including SONET and SDH networks.

RELATED ART

New networks and information exchange capabilities that were unimaginable even in recent times are being developed and implemented in a way that impacts businesses and individuals in a significant way. For example, standalone computers may now be integrated with wireless radio telephones to allow the transmission of information from the computer to a destination by way of a wireless communication network and then by way of the internet.

The recent explosion of the internet is creating the capability and desire for networks of all types to be integrated and coupled to exchange data signals carrying the varying types of information. In many cases, the same data will also be transported through a local area network (LAN) prior to being delivered to the internet. Thus, by way of example, a digitized signal can be transported from a source through a LAN and through the internet, to a final destination. Moreover, within the internet portion itself, there may be a need to transport the user data through a backbone data transport infrastructure, by way of example, through a fiber optic ring network.

Generally speaking, the internet is, in essence, a collection of many large and small computer networks that are coupled together over high speed backbone data links such as T-1, T-3, OC-1 and OC-3. Stated differently, the internet is a network of networks. As a result of the creation of the internet, worldwide access may be achieved. People and their equipment may now communicate from most any civilized point to another in a fast and relatively inexpensive medium.

While it is popular to think of the internet as one network of networks, there are other such internets that are in existence and that are under development. For example, the network now commonly known as the internet was originally a network of institutional networks including university networks. As a result of the commercialization of the internet and the resultant reduction in quality of service, new generation internet type networks are under development to better achieve the purposes of the original "internet". Moreover, new international standards and protocols are being approved to create additional and enhanced internets. For the sake of simplicity, however, each of the worldwide internet networks will be referred to collectively as the internet.

Regarding its physical aspects, the internet is a packet switched network that is currently based upon a group of protocols known as transmission control protocol/internet protocol (TCP/IP). TCP is a connection-oriented protocol that first establishes a connection between two computer systems that are to exchange data. TCP then breaks a given digital information signal into packets having a defined format. The packets are then attached to headers that are for containing control and address information.

For example, in addition to a destination address, a TCP packet typically contains a sequence number that is to be used by the destination in reconstructing a signal that is similar to the original digital information that was broken into packets at the originating end. TCP packets also typically include port IDs, checksum values and other types of control information as is known by those skilled in the art.

IP protocol is used for routing purposes. Thus, the IP protocol includes the destination and originating addresses and default gateway identifiers. IP routers, therefore, are operable to evaluate IP protocol information for routing an IP data packet and to evaluate TCP protocol information for error control and other similar purposes.

In order to make communication devices created by companies throughout the world compatible with each other to create local area networks and worldwide networks such as the internet, protocols and standards are often defined. These protocols and standards are used to guide the design of the communication devices, and more specifically, to guide the design of the operating logic and software within the devices. While communication devices that are designed in view of these standards do not always follow the suggested models exactly, they are usually compatible with the protocol-defined interfaces (physical and logical). In order to appreciate the construction and operation of many devices, it is important to generally understand the concepts of some of the significant protocol standards and models.

One important model that currently guides development efforts is the International Standards Organization (ISO) Open Systems Interconnection (OSI) model. ISO/OSI provides a network framework or model that allows equipment from different vendors to communicate with each other. The OSI model organizes the communication process into seven different categories or layers and places these layers in a sequence based on their relation to the user. Layers 1 through 3 deal provide actual network access and control. Layers 4 through 7 relate to the point to point communications between the message source and destination.

More specifically, the seven layers in the OSI model work together to transfer communication signals through a network. Layer 1 includes the physical layer meaning the actual hardware that transmits currents having a voltage representing a bit of information. Layer 1 also provides for the functional and procedural characteristics of the hardware to activate, maintain, and deactivate physical data links that transparently pass the bit stream for communication between data link entities. Layer 2 is the data link layer or the technology specific transfer layer that effectuates and controls the actual transmissions between network entities. For example, layer 2 provides for activation, maintenance, and deactivation of data link connections, character and frame synchronization, grouping of bits into characters and frames, error control, media access control and flow control.

Layer 3 is the network layer at which routing, switching and delaying decisions are made to create a path through a network. Such decisions are made in view of the network as a whole and of the available communication paths through the network. For example, decisions as to which nodes should be used to create a signal path are decided at layer 3.

As may be seen, layers 1, 2 and 3 control the physical aspects of data transmission.

While the first three layers control the physical aspects of data transmission, the remaining layers relate more to communication functionality. To illustrate, layer 4 is the transport layer that defines the rules for information exchange and manages the point to point delivery of information within and between networks including providing error recovery and flow control. Layer 5 is the session layer that controls the basic communications that occur at layer 4. Layer 6 is the presentation layer that serves as a gateway (a type of "software" interface) between protocols and syntax of dissimilar systems. Layer 7 is the application layer that includes higher level functions for particular application services. Examples of layer 7 functions include file transfer, creation of virtual terminals, and remote file access.

Each of the above defined layers are as defined by the OSI model. While specific implementations may vary from what is defined above, the general principles are followed so that dissimilar devices may communicate with each other.

With respect to the forgoing discussion regarding the seven OSI layers, IP is a layer three protocol. In contrast, many of the backbone data transport infrastructures utilize a different layer protocol than an internet router.

Many of the common backbone data transport systems utilized include time division multiplexed (TDM) double ring transmission systems. Double ring TDM systems are generally known, especially for fiber-optic communication networks. In order to maintain transmission in the event of a fault on one of the channels or communication links, it is typically common to find ring transmission systems in which transmissions occur in two directions. Specifically, transmissions occur in one direction through all of the nodes in the ring in a working path and through an opposite direction in a protection path. The protection path is, traditionally, a redundant path for transmitting signals in a failure condition. Examples of fiber optic TDM systems include the SONET and SDH double ring fiber optic communication systems used in North America and Europe, respectively.

In ordinary conditions, either the user traffic (data) in the redundant path in these double ring systems is not routed through the protection path or, alternatively, it is routed but is not processed by a destination. At the same time, its communication channels are reserved as an alternate path during failure conditions. The redundant path is typically used to route the data signals in an opposite direction from the working path so that data that is to be routed to a destination node located, "downstream" from the failure condition may still be delivered to the destination node.

One problem with this approach, however, is that the capacity of the redundant ring must be reserved as a redundant path. Transmission efficiency and throughput capacity must be sacrificed to provide data protection. Additionally, error conditions that prompt a node to switch to the protection path often are related to hardware (layer 1) problems in which communications are not being successfully transmitted in a communication link. Switching does not occur for those conditions in which switching may be desirable even if there is not a hardware related error. For example, switching might be desirable to alleviate user traffic congestion.

Additionally, several challenges exist in implementing dual ring topologies. For example, it is necessary for the switching from the working path to the protection path to occur quickly in the event of a fault so that a minimal amount of information is lost. Typically, switching occurs at the layer 1 level to minimize the down time. As a result, however, little error protection is provided at the hardware level for failures. Additionally, layer 1 switching results in the switching of entire data transport pipelines. By way of example, a typical pipeline that is switched as a result of a layer 1 switching decision and event is either a 155 mega bits per second (Mbps), 622 Mbps or 2.4 giga bits per second (Gbps) pipeline.

To accomplish fast switching, layer 1 overhead signaling messages are generated and transmitted back to the ingress node (among other nodes) identifying the fault condition so that the protection switching may occur quickly. More specifically, layer 1 overhead signaling messages are transmitted by the nodes detecting the error (typically the two nodes on either traffic side of the detected problem) on a communication link so that the ingress node may effectuate the change on a quick basis. Typically, the ingress node includes dedicated circuitry for reading, interpreting and quickly responding to the overhead signaling message to effectuate a change. As is implied by the foregoing discussion, the overhead signaling is set upon the occurrence of a significant hardware failure in a communication link.

Historically, delays that are encountered in the internet have been acceptable, though not well liked, in the context of computer to computer communications. As other types of data are transported over the internet, by way of example, either voice or video, there will be a need for transporting data in large quantities in a quick manner. There is, therefore, an increasing need for integrating internet communication networks with fiber optic ring networks utilizing a TDM protocol for transporting data because of the speed and throughput capacity of fiber optic ring networks. Accordingly, there is a need for a fiber optic ring network node that is capable of reliably and quickly transporting user traffic to and from the internet. Additionally, however, there also is a need to implement systems that accomplish these goals economically.

SUMMARY OF THE INVENTION

To overcome the shortcomings of the prior systems and their operations, the present invention contemplates a fiber optic ring network that includes a plurality of fiber optic ring networks that provide routing of IP traffic. User traffic may be conducted on a working path or on a protection path in the event of a communication link failure in the working path. A central node is coupled to a plurality of nodes to provide a forwarding table for the nodes to use to forward a data packet received from the central node. The central node also provides updates for the forwarding table to the nodes. As a result, IP traffic may be routed through the fiber optic ring network in a manner that provides fast switching from a working path to a protection path to minimize lost data packets whenever a communication link in the working path fails. Additionally, this capability is provided without requiring each node to have full IP routing capability. Because the central node creates and provides forwarding tables and forwarding table updates for each of the nodes on the fiber optic ring network, the individual nodes are not required to have full IP router capability thereby reducing complexity and cost.

As an additional benefit of the disclosed network, the forwarding table provides path routes and forwarding for the data packets on a packet by packet basis. Accordingly, large amounts of communication resources need not be reserved for protection purposes because the invention provides protection path switching for only those data packets whose working path route is affected by the communication link failure.

The disclosed invention also provides an apparatus and a method for creating forwarding tables on a packet by packet basis for at least one virtual private network wherein a subscriber is assigned specified communication channels or resources for transporting the subscriber data. Additionally, a method and an apparatus are provided for forwarding data packets through the fiber optic ring network in a multicast transmission scheme wherein a given node receives a data packet, outputs it to an external destination, and also forwards the packet to another node in the fiber optic ring network. For this embodiment, the central node generates at least two forwarding tables for each node in the fiber optic ring network.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Description of a Needed Solution

Modern networks are being designed to transport user traffic containing varying types of information including voice, image, text, control signals and numerical data. The user traffic is routed through access multiplexers, gateways (interface devices for systems communicating using differing formats), add drop multiplexers (ADMs), fiber optic cross connects, ATM switches and internet protocol (IP) routers. Multiple layers of routing, multiple logical layers of path establishment, and different technologies guide the routing and paths used for transporting the user traffic.

As mentioned before, the internet is a plurality of networks that are coupled by high capacity data transport mediums. One very important data transport medium is the fiber optic ring network such as SONET or SDH networks (collectively, "fiber optic ring networks"). Fiber optic ring networks typically utilize a protocol that includes data packets having a fixed or defined length. For example, a SONET network "cell" is a data packet that allocates 48 bytes for data and 5 bytes for a header.

Fiber optic ring networks transport optical signals in a working path and, at least occasionally, in a protection path using one of many time division multiplexing data transmission formats. Some systems include a dual ring topology while others include a single ring that transmits user traffic in two directions (bi-directional). Because fiber optic ring networks will increasingly be used to transport IP user data as the importance of the internet continues to grow, the fiber optic ring networks and IP networks must be made to coexist in a compatible and acceptable manner. By some estimates, IP traffic will be the most common type of traffic transported over fiber optic ring networks in the next century.

Accordingly, there is an increasing need for transporting IP over fiber optic ring networks. The inventors herein have observed that combining IP and TDM to meet this need, however, requires level 3 type functionality to be performed in addition to level 1 and level 2 functionality on the fiber optic ring networks. This combination is necessary in order to have a system that is able to fully interact with IP Routers and that can dynamically make routing decisions on a fiber optic ring network as communication link problems are detected.

Potential Solutions

Figure 1:
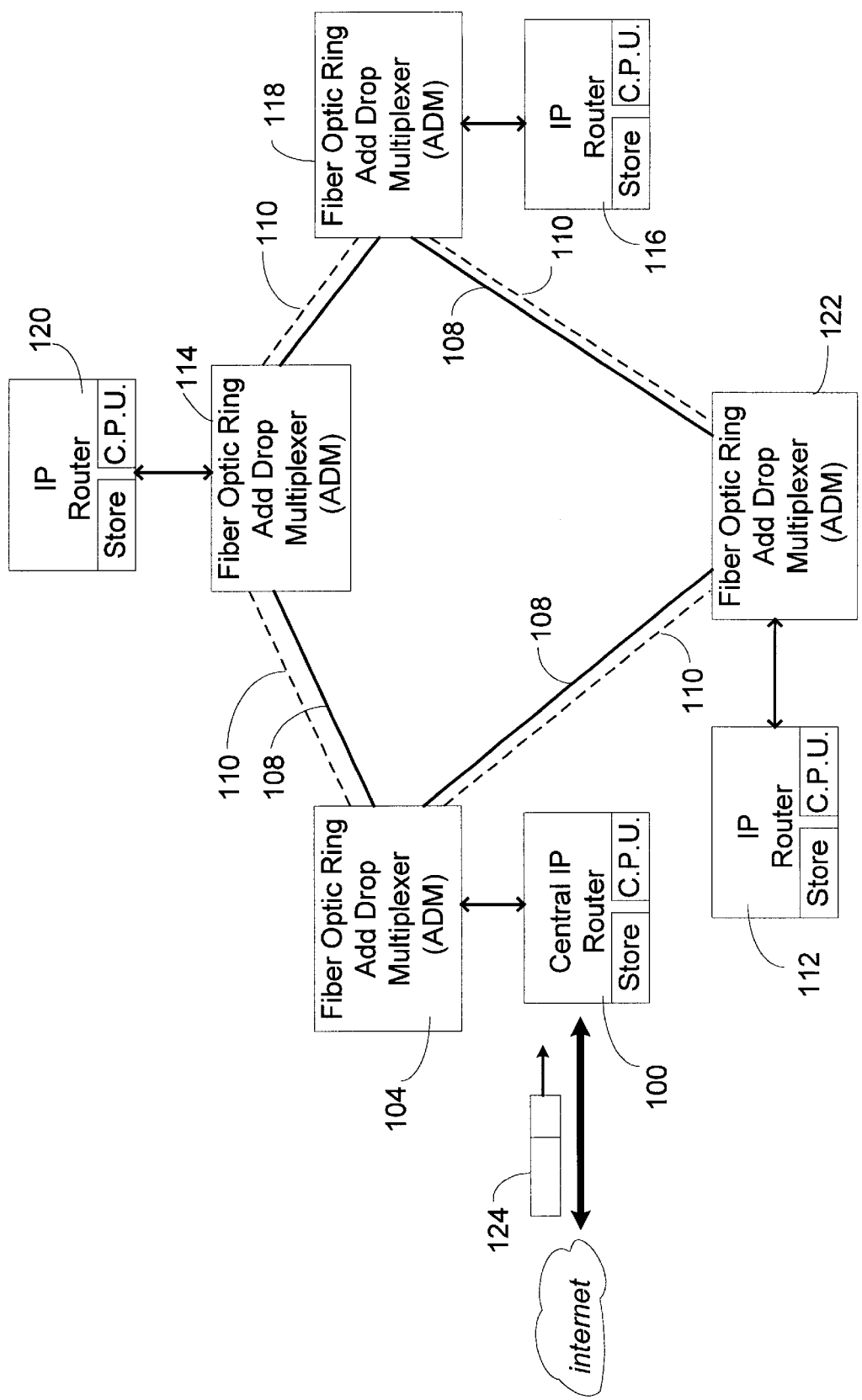
FIG. 1 is a schematic diagram of one technique for combining IP and a fiber optic ring TDM network to transport IP user traffic over a fiber optic ring.

FIG. 1 is a functional block diagram of a schematic of a fiber optic ring network for transporting IP user traffic. Referring now to FIG. 1, central IP router 100 is connected to deliver and receive IP user traffic to and from add/drop multiplexer (ADM) 104. ADM 104 is coupled to transmit and receive user traffic over fiber optic ring 108 in a TDM format. Central IP router 100 is coupled to IP routers 112, 116 and 120 via ADMs 104, 114, 118 and 122, respectively, through dedicated paths in the fiber optic ring network. The ADMs provide transparent routing/forwarding of the user traffic for which IP router 100 is the ingress node. Generally, each of the routers 100, 112, 116 and 120 are similar in structure. As may be seen, central IP router 100 also is connected to the internet to receive internet user traffic as well as internet parameter data 124 as shown in FIG. 1. Internet parameter data includes information regarding networks and computer systems that are coupled to the internet as well as path information (e.g., communication link failures). Central IP router 100 uses the internet parameter information to determine IP packet routing whenever it receives a packet of data that is to be transmitted to a specified location.

In operation, central IP router 100 receives user traffic in IP packet form from, by way of example, the internet and determines where the packet should be routed. For those packets that it determines should be routed through the fiber optic ring network, central IP router 100 produces the user traffic to the fiber optic ring ADM without any knowledge of the fiber optic ring architecture or its available paths. Central IP router 100 merely specifies the destination IP router address and allows ADM 104 to route the IP packets to the ADM that is coupled to the specified IP router that is specified in the IP path routes. Stated differently, central IP router 100 treats the ADM and the fiber optic ring merely as a transport layer.

One less desirable effect of this configuration is that the IP router does not receive or evaluate information regarding topology (including layer 1 or layer 2 failure information) or restoration capability, for the fiber optic ring. Stated differently, the layer 3 routing functionality of central IP router 100 does not include any analysis of layer 1 and layer 2 operations in the fiber optic ring. Thus, the layer 3 functionality of central IP router 100 only detects a layer 1 failure condition in the fiber optic ring only whenever user traffic fails to reach a destination.

One advantage of the configuration of FIG. 1 is that it provides for fast switching times in the fiber optic ring in the event of a layer 1 or layer 2 failure within the ring. A disadvantage is cost because it requires a full IP router and an ADM at each node of the fiber optic ring in addition to a separate star or mesh network coupling each IP router in the network to the central IP router 100.

That the fiber optic ring performs switching within its network in response to a failure transparently with respect to the IP router suggests that throughput redundancy is required. In other words, the capacity of the working paths in a fiber optic ring network must be duplicated in a protection path to have a system that transparently switches user traffic paths whenever a communication link failure occurs. Thus, while the solution of FIG. 1 is advantageous in that protection switching occurs quickly at the layer 1 and layer 2 levels, it is not an economic solution in terms of transport efficiency.

Figure 2:
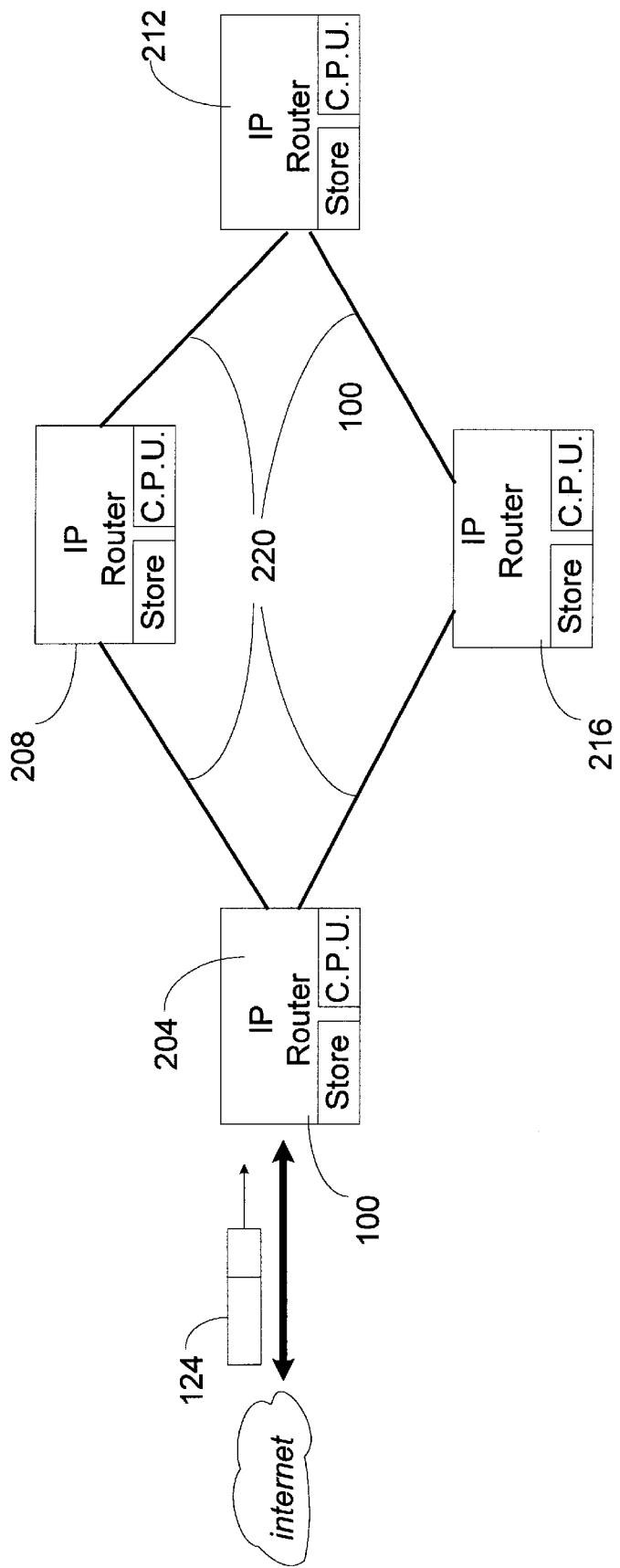
FIG. 2 is a schematic diagram of a plurality of IP routers connected in a fiber optic ring for transporting IP user traffic over a fiber optic ring network.

FIG. 2 is a functional block diagram of a fiber optic ring network including a plurality of IP routers for transporting IP user traffic. Referring now to FIG. 2, a central IP router 204 is coupled to IP routers 208, 212 and 216 via fiber optic ring 220. IP router 204 also is coupled to receive user traffic and internet parameter data 124 from an external source (e.g., the internet).

In operation, central IP router 204 receives user traffic and routes it through the fiber ring network of IP routers according to IP addresses specified in the headers of the IP packets according to TCP/IP formats and protocols. One advantage of the network of FIG. 2 is that it is less expensive than the network of FIG. 1 because it does not require the ADMs to route the IP user traffic yet it is capable of routing IP user traffic over a fiber optic ring network. A disadvantage observed by the inventors of this application, however, is that the IP routers 204–216 of FIG. 2 operate at layer 3 of the OSI model. Accordingly, in the event of a layer 1 or layer 2 type of communication link failure, it may take tens of seconds or even minutes to detect the failure by the layer 3 functionality of IP router 204. Typically, communication link failures are detected at layer 3 when the IP router transmitting an IP packet of user traffic does not receive an expected signal. It would be advantageous to have a system in which functionality of layers 1 through 3 are provided in a system capable of responding to failures and conditions detected at any layer within fifty milliseconds.

Description of the Preferred Solutions

Figure 3:
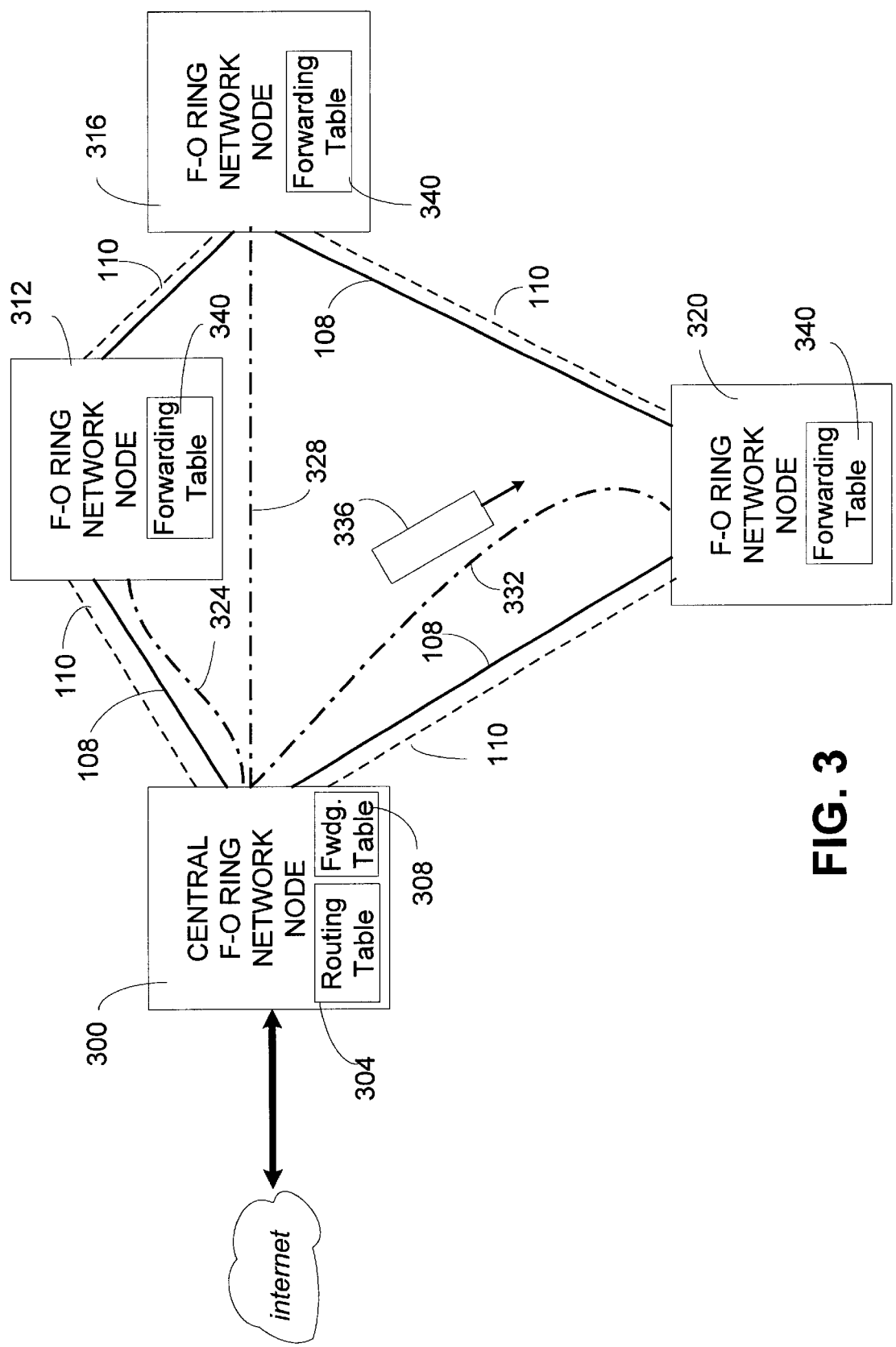
FIG. 3 is a functional block diagram of a fiber optic ring network according to a preferred embodiment of the invention.

FIG. 3 is a functional block diagram of a fiber optic ring network according to a preferred embodiment of the invention. Referring now to FIG. 3, a central fiber optic ring network node 300 includes a memory 304 for storing a routing table for specifying routing through a fiber optic ring network (and beyond). Additionally, node 300 includes a memory 308 for storing a forwarding table for specifying packet forwarding through the fiber optic ring network. The network shown in FIG. 3 also includes nodes 312, 316 and 320. Each of the nodes 300, 312, 316 and 320 are coupled in a ring topology by fiber optic ring 108 and by fiber optic ring 110. Rings 108 and 110 conduct traffic in circularly opposite directions to provide working and protection path routing to every node on the fiber optic ring network. In an alternate embodiment, the nodes are coupled by only one fiber optic ring 108. In this alternate embodiment, traffic is conducted in circularly opposite directions on the one ring 108. In all subsequent discussion regarding the fiber optic ring network, both embodiments are included even though only one of these two embodiments will be described in some instances.

Control communications lines 324, 328 and 332 each couple nodes 312, 316 and 320 to central fiber optic ring network node 300 in a star topology. Node 300 transmits forwarding tables and table updates to nodes 312, 316 and 320 (the "forwarding nodes") over the control communication lines 324, 328 and 332. In the described embodiment, the control communication lines comprise logical paths through the fiber optic ring network and are not formed of physical lines. In an alternate embodiment, however, the control communication lines may be formed of physical lines.

Upon receiving a table, each of the nodes stores it within memory 340. Node 300 also transmits forwarding table updates to each of the forwarding nodes, in the described embodiment, over control communication lines 324, 328 and 332. By way of example, FIG. 3 shows an update signal 336 being transmitted by node 300 to node 320 over control communication line 332. Each of the forwarding nodes updates the forwarding tables in memory 340 upon receiving update signal 336.

Because node 300 determines the routing and generates forwarding tables to each of the forwarding nodes, the forwarding nodes are not required to have full IP router functionality. Cost and complexity, therefore, are significantly reduced. The forwarding tables that are produced by the central node 300 for the forwarding nodes include working path and protection path forwarding specifications. In one embodiment, a multi-protocol label switching (MPLS) scheme is used to specify the forwarding. In an MPLS scheme, logical path definitions are used to direct data packets in the fiber optic ring network.

In another embodiment, the forwarding tables merely specify output ports and channel assignments on the ports for packets received from specified input ports on specified channels. In yet another embodiment, the forwarding tables merely specify the destination node ID for the next communication link or a port if the packet is to be output from the fiber optic ring network. As may be seen, the forwarding tables may be set up in a plurality of different manners to achieve the same result. In general, however, the central node determines the forwarding for the other nodes in the network. Accordingly, the other nodes do not require the complexity to be able to function as full IP routers.

In the described embodiment, the fiber optic ring network includes the central node 300 and a plurality of other nodes. In this embodiment, central node 300 actually includes operational logic in the form of computer instructions that are not found in the other nodes. In alternate embodiments, however, any of all of the remaining nodes may also serve as central nodes for IP traffic that is received and routed/forwarded through the fiber optic ring network. In these embodiments, the concept of a central node is a logical reference made in relation to the location at which IP user traffic is received.

In an alternate embodiment of a network that utilizes an MPLS scheme, central node 300 assigns labels to the data packets it produces on the fiber optic ring network to cause some of the data packets to be transmitted on the protection path (protection path restoration) whenever the central node 300 becomes aware from an overhead signaling message that a communication link has experienced a specified problem. By way of example, either congestion or a communication link outage may result in protection path restoration. Not all of the packets are then routed on the protection path. Only those data packets whose path route is affected by the communication link failure are routed on the protection path. In general, it is the data packets whose final destination on the fiber optic ring network is downstream (on the working path) that are assigned labels to cause them to be routed through the protection path.

Each of the forwarding tables includes forwarding information for the working paths as well as the protection paths. In the embodiments that do not include an MPLS scheme, however, additional information may need to be provided to the nodes to enable them to determine whether to forward a packet along a working path or a protection path. One skilled in the art may readily determine the contents of the forwarding table according to the selected scheme for routing/forwarding packets.

In the currently preferred embodiment, central node 300 merely generates forwarding tables that are independent of the fiber optic ring network path restoration mechanisms.

Figure 4:
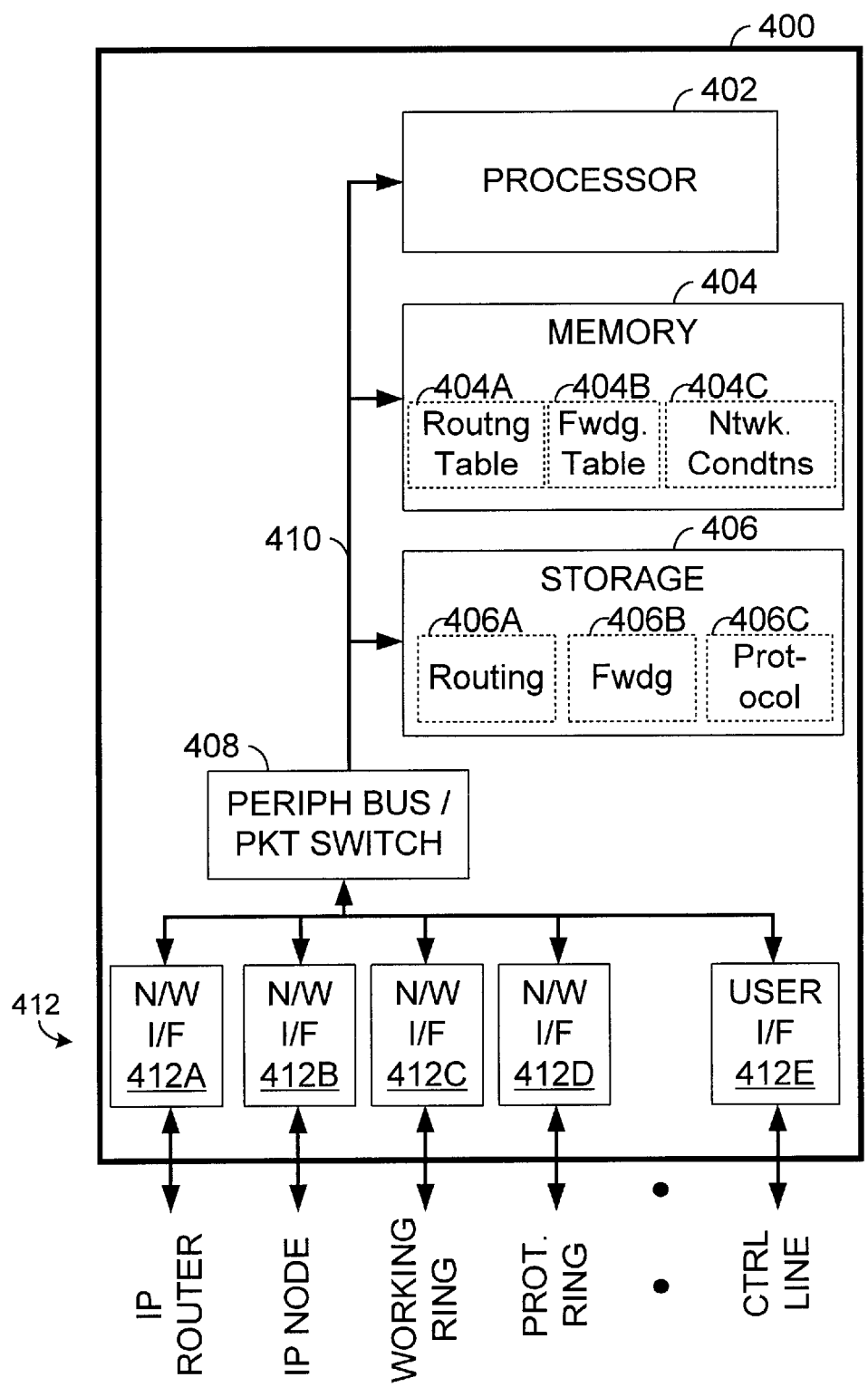
FIG. 4 is a functional schematic illustrating the components of a central ingress node according to a preferred embodiment of the invention.

FIG. 4 is a functional schematic illustrating the components of a central ingress node according to a preferred embodiment of the invention. Referring now to FIG. 4, an ingress node 400, for the purposes herein, is a node that receives IP traffic that requires routing through the fiber optic ring network. In the preferred embodiment of the invention, the ingress node 400 is responsible for determining the path route for a data packet through the fiber optic ring network.

Central ingress node 400 includes a processor 402 that is communicatively coupled to a memory 404, a storage device 406 and a peripheral bus interface through a bus 410. Peripheral bus interface, in turn, is communicatively coupled with network interface devices 412A, 412B, 412C, 412D and 412E. Each of these network interface devices are connected, for exemplary purposes, to an IP router, an IP node, a first ring of a fiber optic ring network, a second ring of a fiber optic ring network, and a communication control line, respectively.

Storage device 406 can be formed of any one or of a plurality of devices for storing operational logic, protocol information, programming steps and instructions, and gateway logic to convert signals from one protocol to another. By way of example, portions 406A and 406B are for storing instructions for creating routing and forwarding tables. Portion 406C is for storing computer instructions that specify operational logic and communication protocols. For example, portion 406C includes protocol information for manipulating traffic formats for traffic being transmitted between the internet and the fiber optic ring network. Additionally, portion 406C includes instructions that specify how and when tables and table updates are to be transmitted over the communication control lines 324, 328 and 332 of FIG. 3 (for example). Finally, portion 406C includes at least two IDs. A first ID is an IP router ID while the second ID is an IP node ID.

In terms of hardware, storage device 406 comprises, in the described embodiment, a flash electronically erasable programmable read only memory (EEPROM). In additional embodiments, storage device 406 comprises read only memory (ROM) circuits, compact disk (CD) ROM devices, Read/Write CDs, tape drives, floppy disks (and similar devices), and other known information storage mediums including electromagnetic disk drives.

With respect to the forwarding tables that are created by processor 402 while executing the corresponding instructions stored within storage 406, different types of forwarding tables may be created according to designer preference. By way of example, a label switching scheme may be used. Alternatively, however, a table may be created that merely utilizes IP identification numbers for specifying how a forwarding node is to forward a packet. Thus, while an entire fiber optic ring network may have only on IP router ID so as to appear as only an IP router to other internet devices, each node may have a separate IP node ID.

Memory 404 comprises random access memory (RAM) with read/write capability for storing operational information while node 400 is operational and is receiving power. By way of example, memory portions 404A and 404B are for storing the routing and forwarding tables, respectively, created by processor 402 while executing the programming instructions stored in memory portion 406A of storage device 406. Memory portion 406C is for storing information relating to network conditions. By way of example, if node 400 either determines on its own or is informed of a network communication link failure, information defining the type of failure and its location are stored in memory portion 406C of memory 406.

Additionally, information stored within storage device 406C defining the fiber optic network ring node such as the nodes that are electrically present, and the communication paths are stored in memory portion 404C for use by processor 402. Additionally, memory 404 includes data used by processor 402 while executing program steps or computer instructions defined in portions 406A, 406B and 406C of storage device 406 as well as in other portions of the storage device. Memory 404 also is for, among other things, storing a fiber optic ring failure condition that was determined by node 400 or that was indicated in a received overhead signal. In terms of hardware characteristics of memory 404, different types of memory may be used. By way of example, memory 404 can comprise 32 bit flash program storage, dynamic RAM, static RAM, etc. Processor 402 is a standard processing unit formed within similar computerized devices and is capable of controlling operations of the node 400 according to the operational logic defined within storage 406. Processors that may be used include customized ASIC devices, off the shelf processors including common commercially available microprocessors and other similar devices.

Peripheral bus interface 408 is a standard bus interface that allows processor 402 to communicate with and control the communications that occur over a plurality of network interface devices 412 that are coupled to peripheral bus interface 408. Network interface devices 412 are transceivers of various types that are coupled to communicate with specific devices. While the described embodiment includes a peripheral bus interface 408, other known devices may be substituted according to system implementation. By way of example, a type of cross connect switch is used in an alternate embodiment of the invention. In an Asynchronous Transfer Mode network, a cell switch is used. Generally, according to system implementation, any type of packet switch may be used in place of the peripheral bus interface. In yet another embodiment, a demultiplexer is used in place of peripheral bus interface 408.

The network interface devices of FIG. 4 may be formed of different known interface systems. For example, they may comprise radio modems, digital signal processors, ASICs, T1/E1 interface devices, etc. The type of device utilized as a network interface device 412 is a function of the type of device with which it will be expected to communicate and can include transceivers of all known types.

In the described embodiment, processor 402 first calculates routing tables that are stored in a memory portion 404A of node 400 as described below. The forwarding tables for each of the nodes are then created so that the other nodes will forward user traffic at the packet level through the fiber optic ring network along path routes that are consistent with those defined in the routing tables created by logic device 324.

For those embodiments of the invention wherein the forwarding tables are created for the nodes on the fiber optic ring network in a network that utilize an MPLS scheme specify a one to one mapping between logical channels. Each logical channel has a unique channel ID known as a label. Accordingly, a central node is able to control the working path and protection path forwarding by selecting the mapping of labels in the forwarding tables for each of the nodes. Accordingly, the forwarding tables define paths through the fiber optic ring channels. A data packet in an embodiment utilizing an MPLS scheme, therefore, is assigned a label that implicitly represents an output port, a carrier frequency and a time slot and, in some embodiments, a quality of service rating delineating a specific application or application type or a specified customer.

Figure 5:
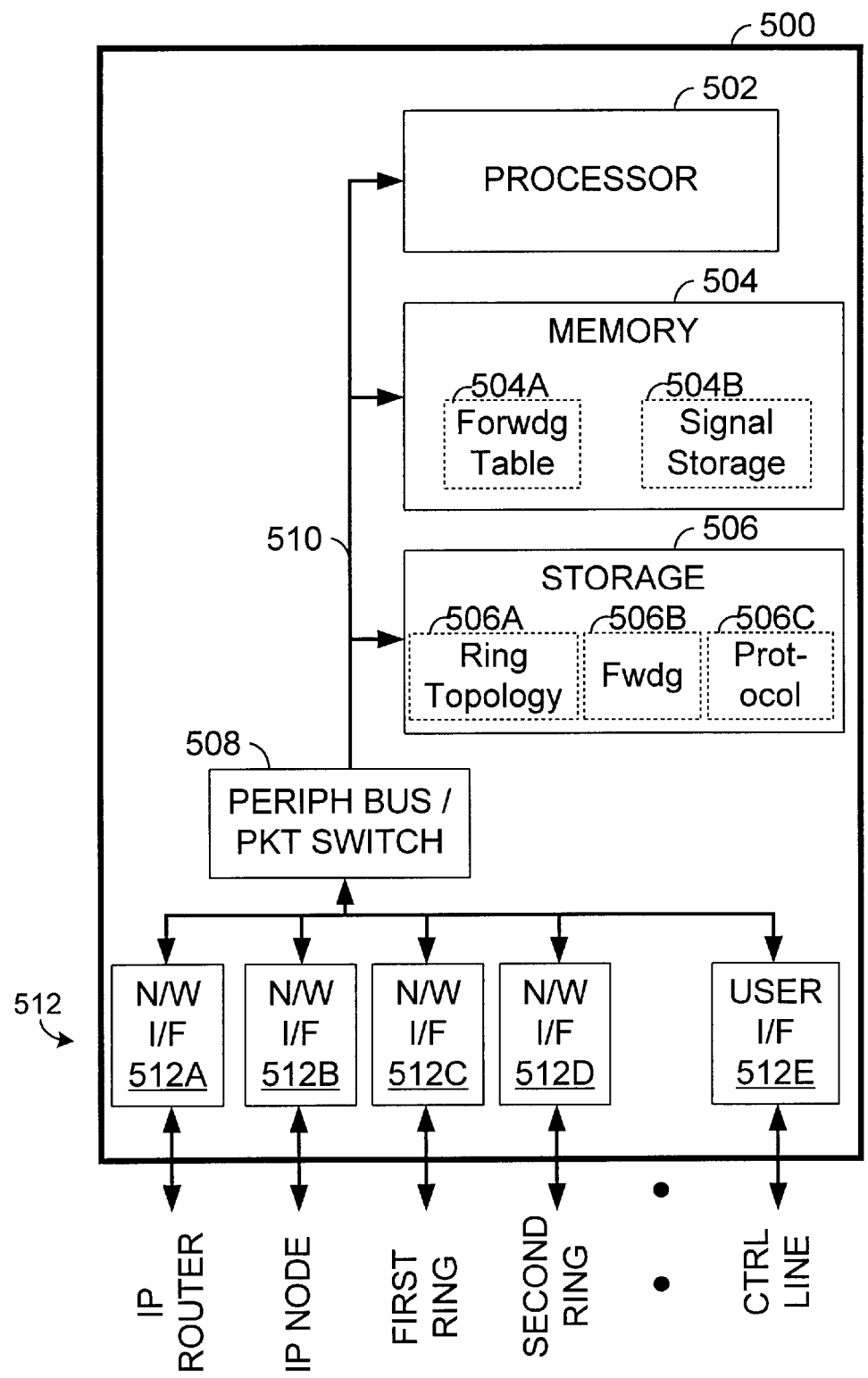
FIG. 5 is a functional schematic illustrating the components of a node for forwarding data packets in a fiber optic ring network according to a preferred embodiment of the invention.

FIG. 5 is a functional schematic illustrating the components of anode for forwarding data packets in a fiber optic ring network according to a preferred embodiment of the invention. Referring now to FIG. 5, a node 500, for the purposes herein, is a node that receives IP traffic that requires routing to an external node or forwarding through the fiber optic ring network.

Node 500 includes a processor 502 that is communicatively coupled to a memory 504, a storage device 506 and a peripheral bus interface through a bus 510. Peripheral bus interface, in turn, is communicatively coupled with network interface devices 512A, 512B, 512C, 512D and 512E. Each of these network interface devices are connected, for exemplary purposes, to an IP router, an IP node, a first ring of a fiber optic ring network (e.g., an "east" side of a ring), a second ring of a fiber optic ring network (e.g., a "west" side of a ring), and a communication control line, respectively.

Storage device 506 can be formed of any one or of a plurality of devices for storing operational logic, protocol information, programming steps and instructions, and gateway logic to convert signals from one protocol to another. By way of example, portion 506A is for storing computer instructions that define ring topology information including the ID numbers of each node and, in some embodiments, specific port IDS for the nodes of the fiber optic ring network. Portion 506B is for storing computer instructions for forwarding data packets according to the contents of a forwarding table stored in memory. Portion 506C is for storing computer instructions that specify operational logic and communication protocols. For example, portion 506c includes protocol information for converting packets from one protocol to another for packets being transmitted between the internet and the fiber optic ring network. Additionally, portion 506C includes instructions that specify how data packets are to be transmitted. For example, if an MPLS scheme is used, how label swapping is to be performed. If another approach is used in a given configuration, portion 506C includes corresponding instructions to define logic for forwarding the packet. Finally, portion 506C includes at least two Ids. A first ID is an IP router ID while the second ID is an IP node ID.

In terms of hardware, storage device 506 comprises, in the described embodiment, a flash EEPROM. In additional embodiments, storage device 506 comprises read only memory (ROM) circuits, compact disk (CD) ROM devices, Read/Write CDs, tape drives, floppy disks (and similar devices), and other known information storage mediums including electromagnetic disk drives.

Memory 504 comprises random access memory (RAM) with read/write capability for storing operational information while node 500 is operational. By way of example, memory portion 504A is for storing the forwarding table received from the central node over the communication control line. Portion 504B is for storing a received packet of user traffic while the node 500 determines how to forward the packet, and in some embodiments, for storing the packet while it is manipulated to be transmitted either onto the fiber optic ring network or externally to an IP node.

In terms of hardware characteristics, different types of memory may be used for memory 504. By way of example, memory 504 can comprise 32 bit flash program storage, dynamic RAM, static RAM, etc. Processor 502 is a standard processing unit formed within similar computerized devices and is capable of controlling operations of the node 500 according to the operational logic defined within storage 506. Customized ASIC devices, as well as off the shelf and common commercially available microprocessors and other similar devices may be used for processor 502.

Peripheral bus interface 508 is a standard bus interface that allows processor 502 to communicate with and control the communications that occur over a plurality of network interface devices 512 that are coupled to peripheral bus interface 508. Network interface devices 512 are transceivers of various types that are coupled to communicate with specific devices. While the described embodiment includes a peripheral bus interface 508, other known devices may be substituted according to system implementation. By way of example, a cross connect switch and a demultiplexer are used in alternate embodiments of the invention instead of peripheral bus interface 508.

The network interface devices of FIG. 5 may be formed of different known interface systems. For example, they may comprise radio modems, digital signal processors, ASICs, T1/E1 interface devices, etc. The type of device utilized as a network interface device 512 is a function of the type of device with which it will be expected to communicate and can include transceivers of all known types.

In operation, processor 502 of node 500, in the described embodiment, is operable, in conjunction with computer instructions in storage device 506, to receive a forwarding table transmitted by a central node 400, by way of example, and to store the forwarding table in memory portion 504A of memory 504. By way of example, a central node 400 transmits the forwarding table over a control and communication line that is coupled to user interface device 512E. Thus, peripheral bus interface 508 communicates with user interface device and 512E and processor is 502 to store the forwarding table in memory 504. Similarly, processor 502 receives updates to the forwarding table and operates to modify the contents of memory 504A according to computer instructions in storage 506B.

Because common fiber optic ring networks utilize a time division multiplex scheme for transmitting data packets, a channel having a label as an identifier is characterized by the ring on which it is carried, the carrier frequency and the time period at which the data packets are transmitted. A data packet is assigned to a label that implicitly represents an output port, a carrier frequency and a time slot and, in some embodiments, a quality of service rating delineating a specific application or application type or a specified customer. However, even in embodiments in which an MPLS scheme is not used, processor 502 outputs data packets through, by way of example, network interface 512C onto the first fiber optic ring at a specified frequency and at a specified time slot according to information stored in the forwarding table within n memory portion 504A.

Figure 6:
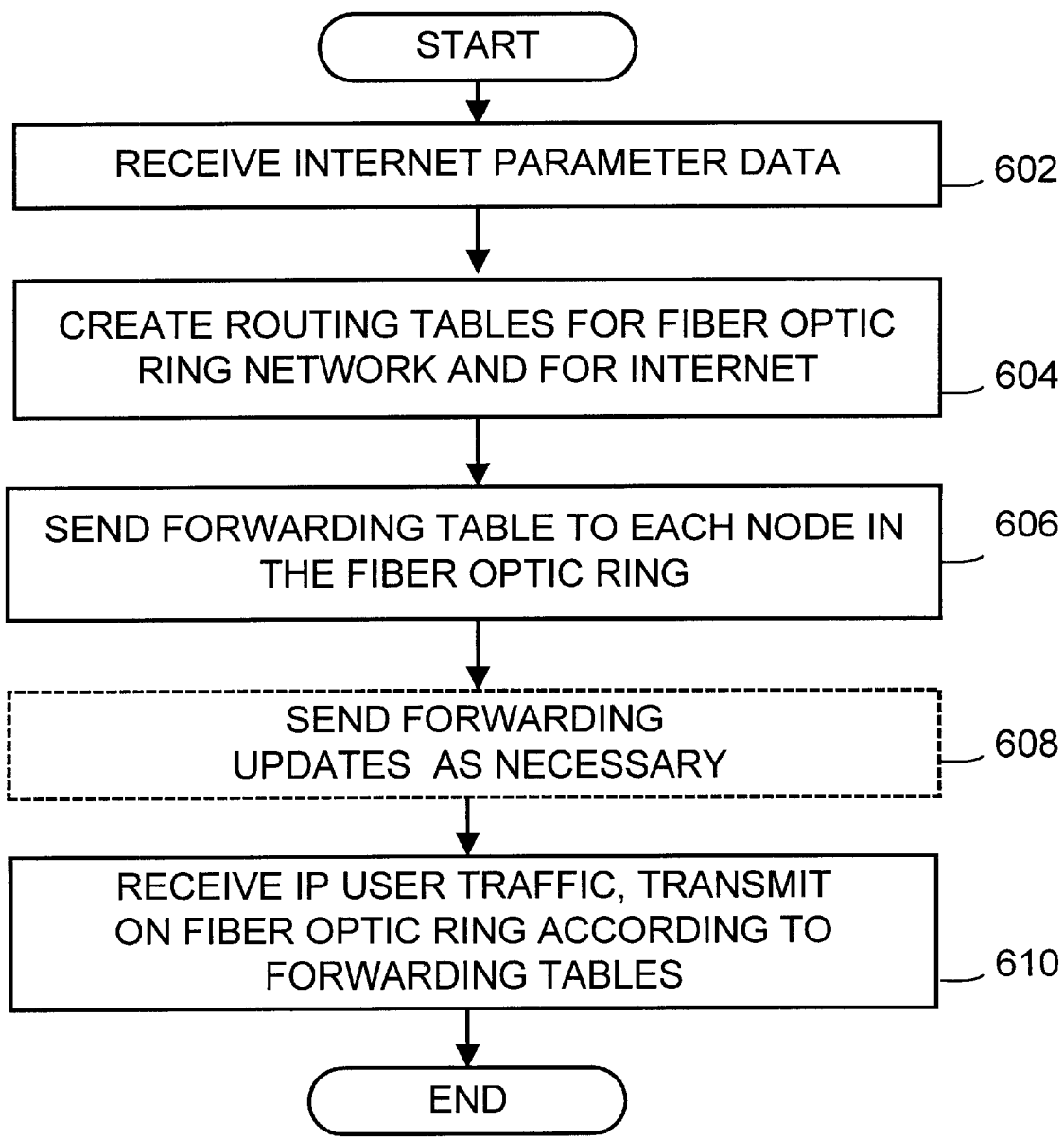
FIG. 6 is a flow chart illustrating a method performed in a central fiber optic ring network node for routing data packets in a fiber optic ring network according to preferred embodiment of the invention.

FIG. 6 is a flow chart illustrating a method performed in a central fiber optic ring network node for routing data packets in a fiber optic ring network according to preferred embodiment of the invention. Referring now to FIG. 6, the node, by way of example, node 300 of FIG. 3, receives a signal 124 of FIG. 1 th at includes internet parameter data (step 602). In one embodiment, every IP router periodically generates network status requests that are transmitted to all IP routers and nodes that a re electrically present and coupled to the internet. In other embodiments, every IP router and node periodically and automatically generates a status signal that is transmitted to all other IP nodes and routers. Regardless of the type of scheme that is used, however, a node such as node 300 of FIG. 3 periodically receives signals transmitted by nodes and routers coupled to the internet. It is through these signals that central node 300 may determine and construct routing tables that are used for directing user traffic to specific internet locations.

Thus, central node 300 uses the internet parameter data to create routing tables for routing IP user traffic and to create forwarding tables for user traffic that is to be transported over the fiber optic ring network (step 604). As a part of creating these routing tables, central node 300 also examines the fiber optic ring network conditions. The ring conditions, by way of example, communication link failures, are used to create the routing tables.

Central node 300 then generates and transmits a forwarding table to each node on the fiber optic ring network for the IP user traffic (step 606). In the described embodiment, the tables are transmitted to the nodes through a control communication line that couples each node to the central node 300. In an alternate embodiment, the tables are produced to the nodes through the fiber optic ring network through an overhead channel in the header (e.g., a SONET/SDH frame header). In a network utilizing an MPLS scheme, for example, the forwarding tables define the channels for conducting user traffic for the working and protection paths for user traffic being originated.

In those embodiments in which an MPLS scheme is used, the forwarding tables create a one to one label mapping. Accordingly, a received data packet will have a label that has a corresponding label in the forwarding table. The corresponding label identifies the channel on which the data packet is to be transmitted. Thus, the label defines the ring (assuming a two ring system), the frequency and the time slot in which the data packet is to be transmitted. The forwarding tables are, in the described embodiment, extracted from the routing tables.

After the central node has transmitted working path and protection path forwarding tables to all of the nodes, it must maintain the information within the tables to keep it current. Accordingly, every time central node receives a signal 336 that defines new internet nodes or network conditions that require changes to the routing paths defined in the routing/forwarding tables, node 300 updates its tables and sends updates to the nodes on the fiber optic ring network (step 608).

After the forwarding table updates (if necessary) and tables have been sent to the nodes on the fiber optic ring network, the fiber optic ring network is ready to transport user traffic. Accordingly, when central node 300 receives IP user traffic, it converts the IP user traffic to TDM format and transmits it onto the fiber optic ring network (step 610). The nodes on the fiber optic ring network then forward the converted IP user traffic as specified in their forwarding tables.

Figure 7:
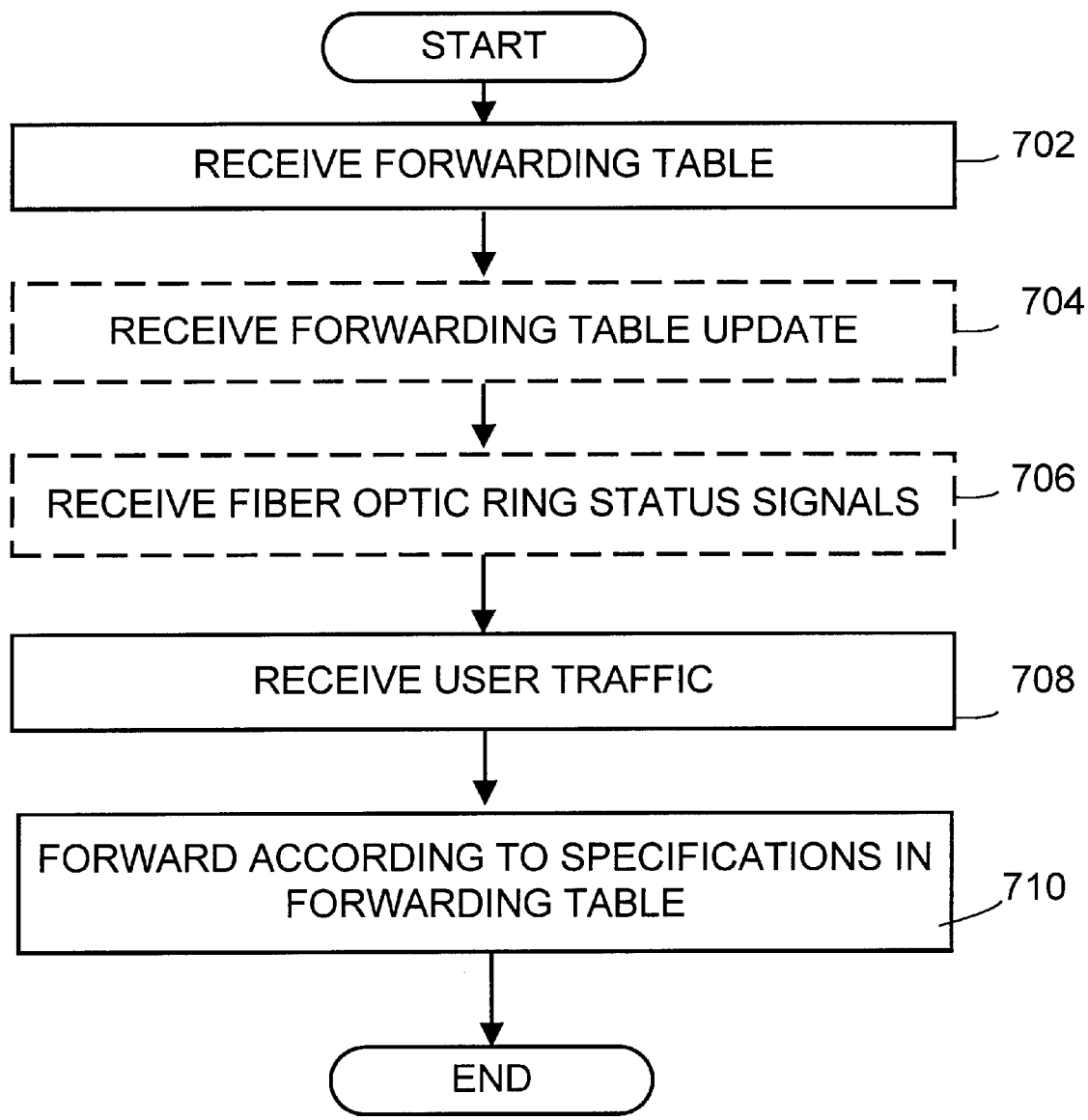
FIG. 7 is a flow chart that illustrates a method in a fiber optic ring network node for forwarding a data packet according to a preferred embodiment of the invention.

FIG. 7 is a flow chart that illustrates a method in a fiber optic ring network node for forwarding a data packet according to a preferred embodiment of the invention. Referring now to FIG. 7, a node receives a forwarding table from a central fiber optic ring network node 300 (step 702). The node then stores the forwarding table. On occasion, the node may receive updates for the tables from the central node (step 704). The updates will typically only be received, however, if there is a condition on the internet or on the fiber optic ring network that requires routing changes to be made to the forwarding tables. These update signals are used to update the stored forwarding tables.

The node may also occasionally receive fiber optic ring status signals (step 706). For example, a signal may be received indicating that a communication link in the fiber optic ring has failed or is congested. The node stores the information as a part of maintaining ring status information.

The node also receives data packets of user traffic that are to be forwarded through the fiber optic ring network (step 708). Whenever such a data packet is received, the node examines the contents of the forwarding table in relation to specific information within or known about the received user traffic. For one example, if an MPLS scheme is being used, the label within the header of the received data packet contains a corresponding label within the forwarding table. In such a case, the node examines the forwarding table to find the corresponding replacement label, and then inserts the replacement label in the header of the data packet. Thereafter, the node forwards the data packet according to the new label (step 710).

In other embodiments, the node examines specified destination information (e.g., destination node ID) within the header to determine whether the packet of user traffic is to be output or forwarded. By way of example, the forwarding table includes, for this embodiment, either an indication of a specified port of the node through which the packet is to be output to the internet or an indication of the channel through which the packet of user traffic is to be transmitted, or both.

Figure 8:
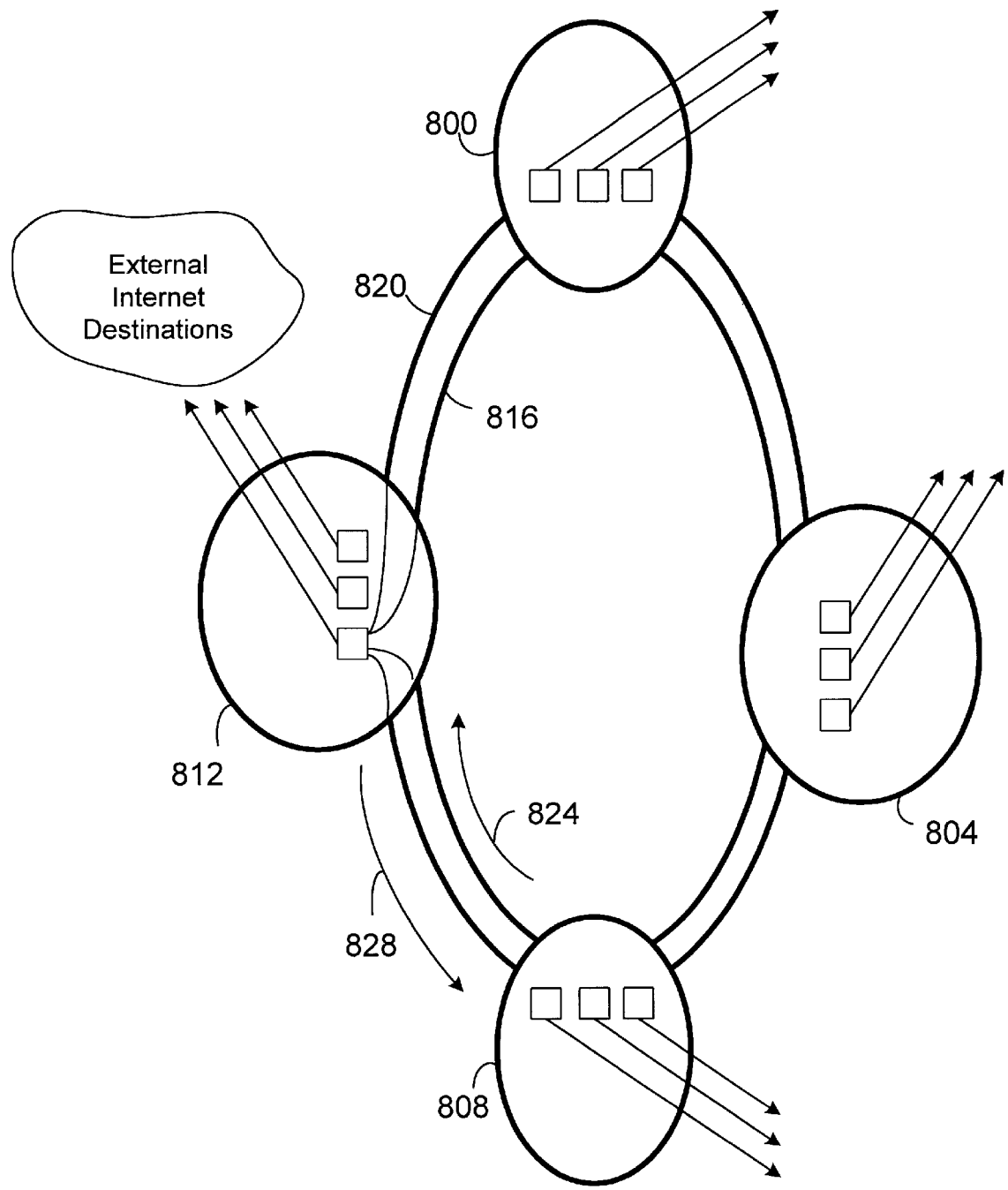
FIG. 8 is a functional block diagram of a fiber optic ring network having a plurality of nodes, each having a plurality of forwarding tables to create virtual private networks according to a preferred embodiment of the invention.

FIG. 8 is a functional block diagram of a fiber optic ring network having a plurality of nodes, each having a plurality of forwarding tables to create virtual private networks according to a preferred embodiment of the invention. Referring now to FIG. 8, a fiber optic ring network includes a central ingress node 800 that is communicatively coupled to nodes 804, 808 and 812 by way of fiber optic ring 816 and fiber optic ring 820. As may be seen, ring 816 conducts user traffic in the direction shown at 824. Ring 820, on the other hand, conducts user traffic in the direction shown at 828. While the embodiment shown in FIG. 8 comprises two rings, namely rings 816 and 820, alternate embodiments include a one ring system that is operable to conduct user traffic in two directions, namely, in the directions shown at 824 and 828.

As may be seen from examining each of the nodes in the described embodiment of FIG. 8, each node includes a plurality of memories within the node. Each of the memories stores a forwarding table for each of a plurality of so called virtual private networks. In a virtual private network, a subscriber is allocated a path and supporting resources for the subscriber's exclusive use. Accordingly, in such an embodiment, a unique forwarding table is created for the subscriber that defines the data packet forwarding for that particular subscriber. Thus, referring again to FIG. 8, a node having three tables illustrates the presence of at least two virtual private networks. Each virtual private network includes its own forwarding table. Accordingly, at least two of the forwarding tables shown within each node of FIG. 8 represent a forwarding table for a RPN. The third forwarding table, is either for all other user traffic or, perhaps, merely for a third subscriber of a virtual private network. Each forwarding table specifies whether the user traffic data packet is to be forwarded through the fiber optic ring network, or whether it is to be output to an external internet destination, by way of example, to an external IP node. The connections between the forwarding tables and the fiber optic rings are shown for only one fiber optic ring network for simplicity. It is understood that, for each VPN, there exists dedicated paths within the fiber optic ring network and dedicated output ports and unique forwarding tables.

Figure 9:
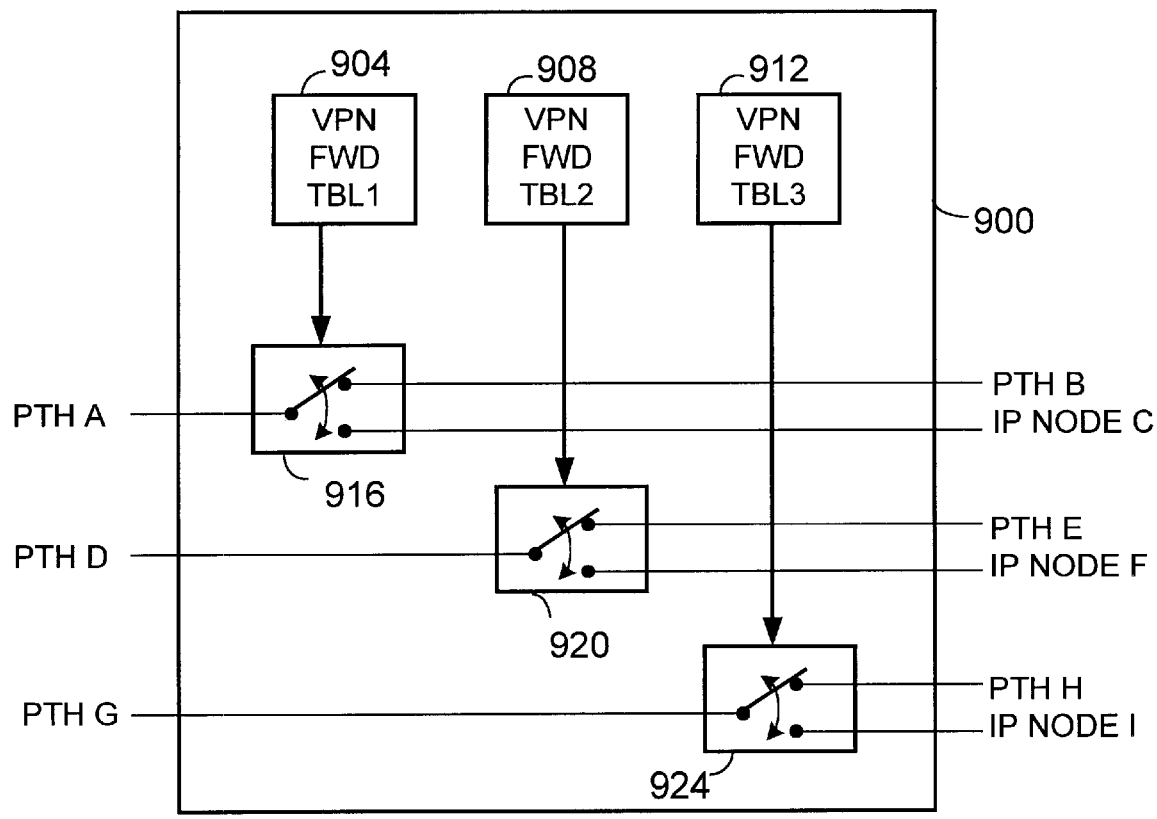
FIG. 9 is a functional schematic diagram of a node having a plurality of forwarding tables, each corresponding to a virtual private network according to a preferred embodiment of the invention.

FIG. 9 is a functional schematic diagram of a node having a plurality of forwarding tables, each corresponding to a virtual private network according to a preferred embodiment of the invention. Referring now to FIG. 9, a node 900 includes a plurality of memory portions for storing a plurality forwarding tables, one for each virtual private network (VPN). More specifically, memory portion 904 stores a first VPN forwarding table. Memory portion 908 stores a second VPN forwarding table. Memory portion 912 stores a third VPN forwarding table.

FIG. 9 also includes a plurality of logical switches 916, 920 and 924. Each of the switches 916, 920 and 924 include an input to receive data packets for specified paths on the fiber optic ring network. Each of the switches also includes a pair of outputs. One output is coupled to a specified IP node external to the fiber optic ring network. The other output is coupled to a specified path on the fiber optic ring network. Finally, each of the memories 904, 908 and 912 are coupled to a selector input of each of the logical switches 916, 920 and 924, respectively.

The embodiment of FIG. 9 is functional in nature. It should be understood that the actual schematic of node 900 resembles the circuitry shown for the node of FIG. 5. One purpose of FIG. 9 is to illustrate how the forwarding tables in a memory of a node having VPNs relate to the routing and forwarding of packets through a node. Thus, as may be seen, a processor, similar to the one of FIG. 5, examines computer instructions within a storage device to determine a corresponding memory portion holding a corresponding forwarding table for a specified VPN according to the identity of the path from which a data packet was received. Accordingly, the processor 502 of FIG. 5 examines the corresponding forwarding table to determine whether the packet is to be output to a device on the internet having a IP node ID or whether it is to be forwarded on a specified path of the VPN to another node on the fiber optic ring network.

Each of the forwarding tables 904, 980 and 912 include IP addresses or labels (if an MPLS scheme is being used to forward packets). In an embodiment in which the forwarding tables include IP addresses, the node can determine whether to forward the packet onto the fiber optic ring network or whether to output the packet to an external device on the internet because the node is aware of the IP addresses of the nodes coupled to the fiber optic ring network.

Figure 10:
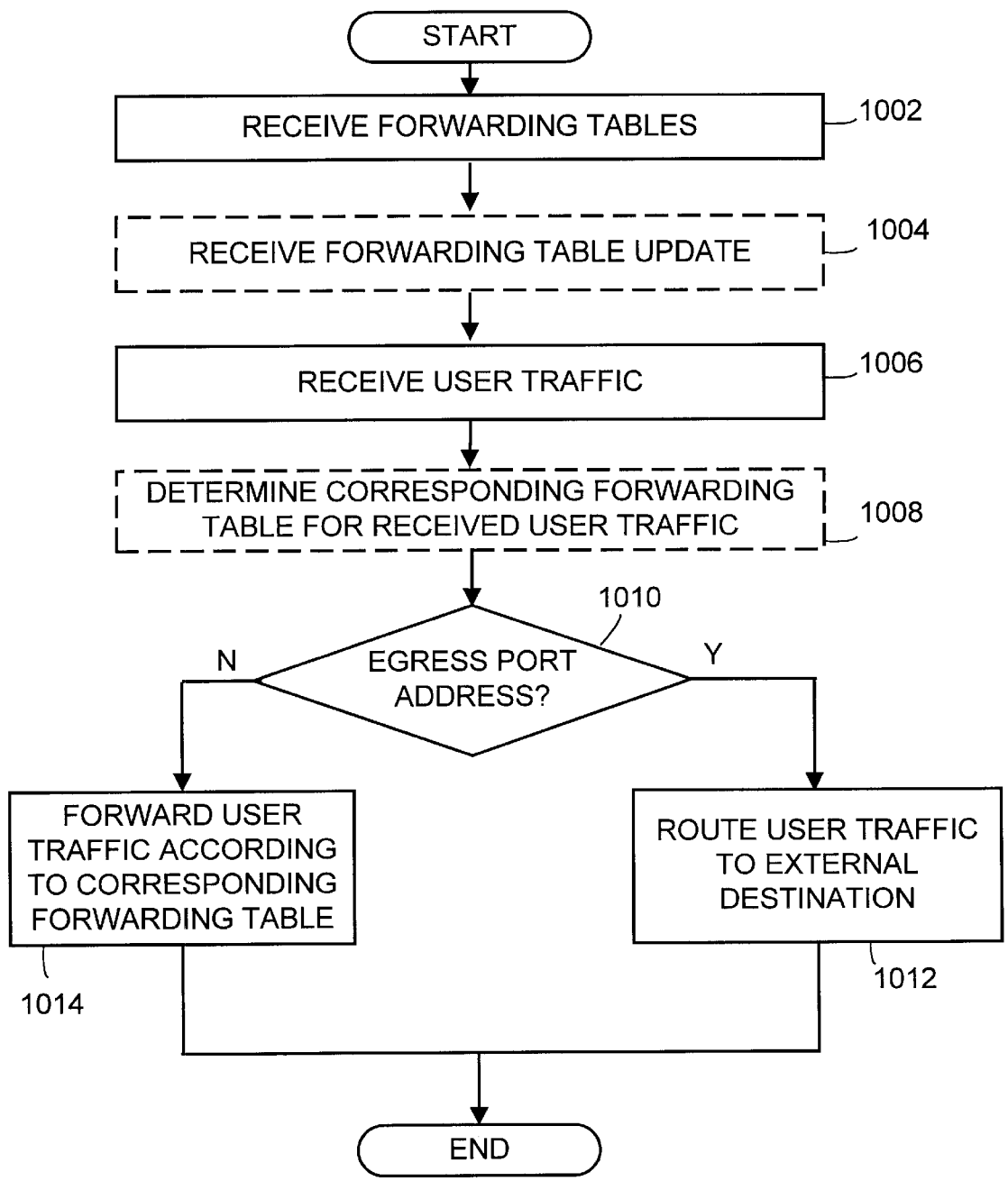
FIG. 10 is a flow chart illustrating a method for routing a data packet through a fiber optic ring network having a plurality of nodes, each having a plurality of forwarding tables to create virtual private networks according to a preferred embodiment of the invention.

FIG. 10 is a flow chart illustrating a method for forwarding a data packet through a fiber optic ring network having a plurality of nodes, each having a plurality of forwarding tables to create virtual private networks according to a preferred embodiment of the invention. A node initially receives at least one forwarding table. In an embodiment comprising VPNs, the node receives a plurality of forwarding tables, one for each VPN (step 1002). The node, optionally, receives updates to the forwarding tables to reflect routing and forwarding changes according either to internet or fiber optic ring topology changes resulting from failures and from actual changes to the configuration of the networks (step 1004).

Once a node is set up with forwarding tables, it is ready and begins to receive user traffic in packet form (step 1006). On a packet by packet basis, the node must determine from examining a forwarding table how to forward or route the packet. If the fiber optic ring network includes VPNs, the node determines the appropriate forwarding table according to the path ID from which the packet was received (step 1008).

In addition to determining the appropriate and corresponding forwarding table, the node also examines the header to determine if it includes an egress port address that is a port of the node (step 1010) In alternate embodiments, the node determines from examining the corresponding forwarding table whether to forward the packet onto the fiber optic ring network or whether to route the packet out to the internet. By way of example, an entry in the forwarding table would define an egress port ID or a forwarding path ID for the given data packet. The packet either is then routed to an external destination (step 1012) or is forwarded onto the fiber optic ring network (step 1014). If the network includes VPNs, then the packet is forwarded according to the corresponding forwarding table for the data packet.

Figure 11:
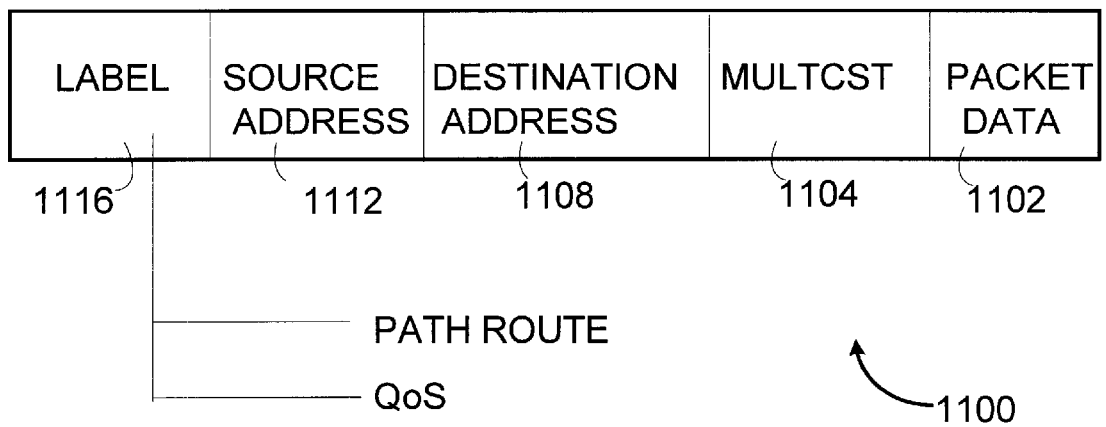
FIG. 11 is a diagram illustrating the elements of a user traffic data packet transmitted by a node on a fiber optic ring network formed to support multicast transmissions on a packet by packet basis according to a preferred embodiment of the invention.

FIG. 11 is a diagram illustrating the elements of a user traffic data packet transmitted by a node on a fiber optic ring network formed to support6 multicast transmissions on a packet by packet basis according to a preferred embodiment of the invention. Referring now to FIG. 11, an IP packet that is received by a central node is converted to at least one data packet such as the MPLS data packet 1100 shown in FIG. 11. The data of the IP data packet is inserted within portion 1102. If the amount of data exceeds the capacity of portion 1102, a plurality of packets will be required to transport the data of the received IP packet.

While IP user traffic data is placed within portion 1102 of at least one data packet 1100, the IP destination address is placed within portion 1108 and the IP source address is placed within portion 1112. As is also shown in FIG. 11, the packet label (MPLS label) is placed in portion 1116. The embodiment of FIG. 11 is for a data packet transmitted in a network formed to support MPLS transmissions. It is understood that a packet may be constructed without portion 1116 for those networks that do not support MPLS.

For those embodiments of the invention that utilize an MPLS scheme for transporting data packets, the label of portion 1116 implicitly represents or defines a plurality of different sets of information. By way of example, the label represents the path route that is to transport the data packet for the next communication link. In addition to the path route, the label in the described embodiment also implicitly represents a quality of service (QoS) rating that is associated with the data packet. As is understood by those skilled in the art, QoS provisioning usually specifies the priority that a given user receives for the user traffic especially in interference situations. Interference situations include those situations where, at a given moment, the demand for channeling resources exceeds throughput capacity. The label may also implicitly represent allocated bandwidth and priority as is further described in the co-pending application filed concurrently herewith.

In addition to the above described elements of signal 1100, a portion 1104 is included. Portion 1104 is for carrying a signal whose logical value reflects whether the packet is to be transmitted in a multicast format. In a multicast transmission, a data packet is received and converted for outputting to a device as well as forwarded on through the network. In general, a multicast scheme is a scheme for broadcasting a message to a plurality of nodes. There are many different implementations that can be used to effectuate a multicast transmission. For example, a data packet may be transmitted having a specified signal within the header as shown in FIG. 11 to inform the node that it is a multicast signal. In an alternate embodiment, a unique entry exists within the forwarding table that identifies the received packet as a multicast packet. In this embodiment, there is no portion 1104 in the header packet to identify the packet as a multicast packet. Rather, a unique destination ID in the header is used, in combination with the unique entry in the forwarding table, to enable the node to identify the packets as a multicast packet.

For example, if the header carries a unique destination ID that reflects that the signal is a multicast signal, the node is able to determine that the signal is to be output as well as forwarded. In this case, the node examines the forwarding table to know what output ports and forwarding paths are to be used. Thus, by way of example, if anode receives a multicast packet, it will output the signal to an external destination and forward the packet to the next node in the path of the fiber optic ring network.

In a FPN network, multicasting may also be supported. By way of example, FIG. 8 can also illustrate a combination of VPNs in a system capable of supporting multicast transmissions. The embodiment of FIG. 8 illustrates that the tables that are created and distributed to the nodes by a central node may include additional capabilities such as VPN, multicasting, neither or both.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the sprit and scope of the present invention as defined by the claims. For example, the invention includes an embodiment wherein each node on the network serves as a central node and provides forwarding tables for each of the other nodes for the TCP/IP packets it receives via its connection to the internet.

We claim:

1. An ingress node in a fiber optic ring network, wherein the ring includes a plurality of nodes, comprising:
    an input interface connected to a packet switched network for receiving data packets in a first format;
    a processor for determining a path for the data packets through the fiber optic ring network in response to header information in the data packets and generating routing and forwarding tables for the data packets through the fiber optic ring network, wherein the forwarding tables include information for each of the plurality of nodes on forwarding the data packets;
    a control channel interface connected to a control channel, wherein the ingress node transmits the forwarding tables to each of the plurality of nodes on the control channel; and
    an output interface for transmitting the data packets onto the fiber optic ring network, wherein the data packets are embedded in a synchronous optical signal format.

2. The ingress node of claim 1, wherein the ingress node periodically receives status signals transmitted by routers in the packet switched network that are used by the ingress node to construct the routing and forwarding tables.

3. The ingress node of claim 2, wherein the ingress node considers fiber optic ring conditions in generating the routing and forwarding tables.

4. The ingress node of claim 1, wherein the control channel is a data communications channel embedded in overhead of the synchronous optical signal format.

5. The ingress node of claim 1, wherein the control channel is an out of band channel.

6. A node in a fiber optic network, wherein the fiber optic network includes a plurality of nodes, comprising:
    a user interface device connected to a control and communication channel for receiving a forwarding table from an ingress node, wherein the forwarding table includes information for the node on where to forward data packets;
    a forward table memory unit that stores the forwarding table;
    an input interface connected to the fiber optic network for receiving a synchronous optical signal and extracting a data packet from the synchronous optical signal;
    a signal storage unit for storing the data packet;
    a processor for determining forwarding of the data packet in accordance with the forwarding table in the forward table memory unit and header information from the data packet; and
    an output interface connected to the fiber optic ring network for transmitting the data packet onto the fiber optic ring in a synchronous optical signal format in accordance with forwarding instructions from the processor.

7. The node in claim 6, wherein the forwarding table stored in the forward table memory unit corresponds to a virtual private network and only includes routing information for traffic flow from a particular subscriber.

8. The node in claim 6, wherein the forward table memory unit stores the forwarding table and one or more additional virtual private network (VPN) forwarding tables that each correspond to a virtual private network and provide routing information for traffic flow from a particular subscriber.

* * * * *